(12) United States Patent
Zhuk et al.

(10) Patent No.: US 7,106,845 B1
(45) Date of Patent: Sep. 12, 2006

(54) DYNAMIC SECURITY SYSTEM AND METHOD, SUCH AS FOR USE IN A TELECOMMUNICATIONS SYSTEM

(75) Inventors: Oscar Veniaminovich Zhuk, Bellevue, WA (US); Patrick Allen Stensberg, Issaquah, WA (US); Jeremy Mark Knight, Bellevue, WA (US); Frederick Allen Epler, Whitefish, MT (US)

(73) Assignee: AccessLine Communications Corporation, Bellevue, WA (US)

( * ) Notice: Subject to any disclaimer, the term of this patent is extended or adjusted under 35 U.S.C. 154(b) by 1101 days.

(21) Appl. No.: 09/604,283

(22) Filed: Jun. 26, 2000

(51) Int. Cl.
*H04M 3/42* (2006.01)

(52) U.S. Cl. .............................. 379/207.11; 379/201.12; 379/189; 455/410

(58) Field of Classification Search ................ 455/410, 455/411, 433, 434, 455.1, 455.2, 456.1, 456.2; 380/247–250, 28, 30, 45; 379/189, 207.12, 379/207.11
See application file for complete search history.

(56) References Cited

U.S. PATENT DOCUMENTS

| | | | | |
|---|---|---|---|---|
| 5,060,263 | A * | 10/1991 | Bosen et al. ................. | 713/184 |
| 5,455,861 | A * | 10/1995 | Faucher et al. ............. | 380/266 |
| 5,481,611 | A * | 1/1996 | Owens et al. ................ | 713/159 |
| 5,787,154 | A * | 7/1998 | Hazra et al. ............. | 379/93.03 |
| 5,937,068 | A * | 8/1999 | Audebert ..................... | 713/185 |
| 5,971,272 | A * | 10/1999 | Hsiao .......................... | 235/380 |
| 6,188,761 | B1 * | 2/2001 | Dickerman et al. .... | 379/265.01 |
| 6,266,418 | B1 * | 7/2001 | Carter et al. ................ | 380/257 |
| 6,338,140 | B1 * | 1/2002 | Owens et al. ............... | 713/168 |
| 6,396,916 | B1 * | 5/2002 | Jordan ......................... | 379/189 |
| 6,421,714 | B1 * | 7/2002 | Rai et al. ..................... | 709/217 |
| 6,487,667 | B1 * | 11/2002 | Brown ........................ | 713/201 |

\* cited by examiner

*Primary Examiner*—Roland G. Foster
(74) *Attorney, Agent, or Firm*—Perkins Coie LLP

(57) ABSTRACT

Rather than employing simple static personal identification numbers (PINs) that are susceptible to hacking, the disclosed security system provides multiple levels of security that may be selected by a user, based on his or her particular level of sensitivity at any given time or with respect to any given data. One level employs an algorithm that changes values, where the algorithm is known by the user. For example, the algorithm may be a series of digits based on the following: hour of day, day of week, quarter of the year, a.m. or p.m., day of the month, and month of the year. If the user knows the order of such, the user can readily generate the appropriate numeric code corresponding to the current time, and since the time continually changes, the code necessarily changes likewise. Another level sends a random part to a user, such as over their pager or phone, which they append to some user-defined, fixed portion of their PIN, or used in addition to their PIN. Another level or method requires the user to interact with a series of predetermined questions that each require a numeric response. The order of the questions would be scrambled each day, or periodically, to help change the user's response to improve security and employ questions that typically only the user would know. Another level of security employs voice fingerprinting or voice pattern recognition. Yet another level employs a N by M matrix of random numbers, from which a user selects numbers from predetermined positions to generate a current security code. Various levels of security may be performed on the server, and are based on user's selections, thus eliminating the need for special hardware.

11 Claims, 14 Drawing Sheets

| | | |
|---|---|---|
| 502 | Record Identifier | User's Account Number |
| 504 | Static Security Mode Enabled? | Yes/No |
| 506 | Dynamic Time Mode Enabled? | Yes/No |
| 508 | Dynamic Pager Code Enabled? | Yes/No |
| 510 | Dynamic Interrogate Enabled? | Yes/No |
| 512 | Voice Fingerprint Enabled? | Yes/No |
| 514 | Static PIN code | <PIN number> |
| 516 | Number Static Mode Retries | 0-K |
| 518 | Number Dynamic Time Retries | 0-K |
| 520 | Number Pager Code Retries | 0-K |
| 522 | Number Dynamic Interrogate Retries | 0-K |
| 524 | Number Voice Fingerprint Retries | 0-K |
| 526 | Time-of-day – $1^{st}$ Parameter | Hour, am/pm, day/week, month/yr., day/month, or quarter/yr. |
| 528 | Time-of-day – $2^{nd}$ Parameter | Hour, am/pm, day/week, month/yr., day/month, or quarter/yr. |
| 530 | Time-of-day – $3^{rd}$ Parameter | Hour, am/pm, day/week, month/yr., day/month, or quarter/yr. |
| 532 | Time-of-day – $4^{th}$ Parameter | Hour, am/pm, day/week, month/yr., day/month, or quarter/yr. |
| 534 | Time-of-day – $5^{th}$ Parameter | Hour, am/pm, day/week, month/yr., day/month, or quarter/yr. |
| 536 | Time-of-day – 6th Parameter | Hour, am/pm, day/week, month/yr., day/month, or quarter/yr. |
| 538 | Code Notification Mode | Pager/email |
| 540 | Pager number | <pager number> |
| 542 | Email address | <email address> |
| 544 | Code Length | 1-J |
| 546 | Code Generation Interval | 1-L (hours) |

*FIG. 5A*

| | | |
|---|---|---|
| 548 | Current Code | <code number> |
| 550 | Question Type | Standard/Custom |
| 552 | Social Security Number, Weighting | <SSN number>, 0-M |
| 554 | Date of Birth, Weighting | <birth date>, 0-M |
| 556 | Home Phone Number, Weighting | <home number>, 0-M |
| 558 | Home Zip Code, Weighting | <home zip code>, 0-M |
| 560 | Mother's Maiden Name, Weighting | <name>, 0-M |
| 562 | Custom Question #1, Weighting | <answer 1>, 0-M, <question 1> |
| 564 | Custom Question #2, Weighting | <answer 2>, 0-M, <question 2> |
| 566 | Custom Question #3, Weighting | <answer 3>, 0-M, <question 3> |
| 568 | Custom Question #4, Weighting | <answer 4>, 0-M, <question 4> |
| 570 | Custom Question #5, Weighting | <answer 5>, 0-M, <question 5> |
| 572 | Voice Data | <voice fingerprint file> |
| 574 | Files Encrypted | <file list> |
| 576 | File Encryption Codes | <decryption code list> |
| | | |
| | | |

*FIG. 5B*

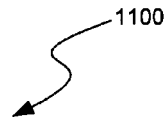

| | |
|---|---|
| Question Type: Do you wish to use Standard/Custom questions?<br><br>Please answer the following questions, and assign a weighting value to each question to indicate how often you would like the system to ask you that question (0 = never; 5 = always): | |
| What is your Social Security Number?<br>  Weighting? | |
| What is your Date of Birth?<br>  Weighting? | |
| What is your Home Phone Number?<br>  Weighting? | |
| What is your Home Zip Code?<br>  Weighting? | |
| What is your Mother's Maiden Name?<br>  Weighting? | |
| | |
| If you would like the system to ask you customized or personalized questions, please enter the questions, answers and weightings below: | |

| | | | | | |
|---|---|---|---|---|---|
| Custom Question #1 | | Answer #1 | | Weighting | |
| Custom Question #2 | | Answer #2 | | Weighting | |
| Custom Question #3 | | Answer #3 | | Weighting | |
| Custom Question #4 | | Answer #4 | | Weighting | |
| Custom Question #5 | | Answer #5 | | Weighting | |

*FIG. 11*

DYNAMIC SECURITY SYSTEM AND METHOD, SUCH AS FOR USE IN A TELECOMMUNICATIONS SYSTEM

TECHNICAL FIELD

The following disclosure relates generally to securities systems, and more particularly to systems and method for providing user security and access to systems such as telecommunications systems and files.

BACKGROUND

Access to confidential and proprietary data is often performed using electronic access or security systems. Electronic security systems are typically employed to access a network, network resources (e.g., servers, modems, electronic mailboxes, etc.), software applications running on servers, portions of the Internet or World Wide Web pages, databases, files or other electronic data. Electronic security systems are particularly important with individual or networked computers that store confidential information.

Other electronic security systems have been developed to authenticate human users, generally with the use of personal passwords or personal identification numbers (PIN). For example, users or subscribers to a telecommunications service, such as voicemail, enter their PINs using touch-tone numeric input (dual tone multi-frequency (DTMF) input). Subscribers can increase the number of digits in their PINs to increase security. For example, employing a 12-digit PIN provides greater security than a 3-digit PIN. Electronic mail (email) systems similarly employ PINs. The PINs may be automatically changed on a periodic basis for increased security. For example, a system administrator for the email system may require that subscribers periodically change their PIN (e.g., change their PIN monthly).

These electronic security systems, however, provide only a limited level of security, since they rely on authenticating a user account number and password or PIN. An unauthorized user may obtain an authorized user's account number and PIN and thereby inappropriately access the system or service. Another drawback with such static PIN security systems is that if long PINs are used, or PINs are changed frequently, users may have difficulty remembering such PINs.

One important requirement for electronic security systems is that they provide a high level of security. For example, some systems perform user authentication, rather than simply performing machine or system authentication. In other words, such an electronic access system authenticates individuals or users who may access the system, rather than a system that has been preprogrammed with access information (e.g., running a "script" to permit access). Such an electronic security system, to maintain security, must ensure that only authorized users are allowed access to the system.

Certain personal authentication systems are available, such as fingerprint identifiers, retinal scan devices, voice fingerprint or sound pattern identifiers, and the like. Such personal authentication systems, however, are typically very expensive and inapplicable to many environments. For example, such fingerprint or retinal scan identification devices are difficult or expensive to employ in a large network of computers, including a network where users may access the network from various geographic locations (e.g., via standard phone lines using a modem and laptop computer). Furthermore, such systems would be inapplicable for use over a voice telephone network, since sophisticated and expensive equipment are required to obtain fingerprint and retinal scan data. Such expensive equipment is simply lacking at nearly all telephone locations to which a subscriber may wish to gain access to the system.

Other security systems employ lower cost devices, such as identification (ID) card readers. Such identification systems require use of a physical ID card having a code or even an algorithm that generates a code at predetermined intervals (e.g., every ten seconds). A server computer (or "server") stores the same code or employs the same algorithm to generate the same code at the same predetermined interval. Thus, a user must possess the card to obtain authentication by the server. However, if the card is lost or damaged, the user cannot be authenticated. Additionally, unauthorized users could simply obtain the card and thereby gain access to the system. Moreover, such a system is applicable only with suitable card readers. Therefore, such a security system would again be inapplicable for use with standard telecommunications equipment, such as a public telephone.

Another known security system employs a software solution known as "Softkey." The Softkey system provides a challenge to a user provided by a server, to which the user must respond, typically by means of a client computer (or "client") coupled to the server. When a user initially logs onto the server, the server, for example, selects 8 words from a table of words, where each word has 4 to 8 characters. The user must then type in each of the eight words. As a result, the user must type 24 to 64 characters in a response to the server's challenge. The server generates the same 8 words, and compares the 8 words it receives from the client to those locally generated. If the two match, then the user is authenticated.

One problem with the Softkey system is that the user must correctly enter the 8 words, requiring up to 64 keystrokes. Such a response by the user can be time-consuming and tedious for nontouch typists. Additionally, the Softkey system suffers from additional limitations which make it not sufficiently robust for use in protecting highly confidential information on a computer network or in other suitable environments. While the Softkey system requires less sophisticated hardware than, for example, fingerprint readers, retinal scan identification devices, and ID cards employing random code generators, the user must nevertheless use a laptop computer which executes a security software routine. Again, a user could not gain access to, for example, a voicemail box system using a public telephone under the Softkey system.

BRIEF DESCRIPTION OF THE DRAWINGS

FIGS. 5A and 5B together are a data structure diagram showing fields of a user's security record.

FIG. 11 is an example of a display description or web page displayable on a user or client computer for receiving answers to questions under the user interrogation security mode.

Figure 1:
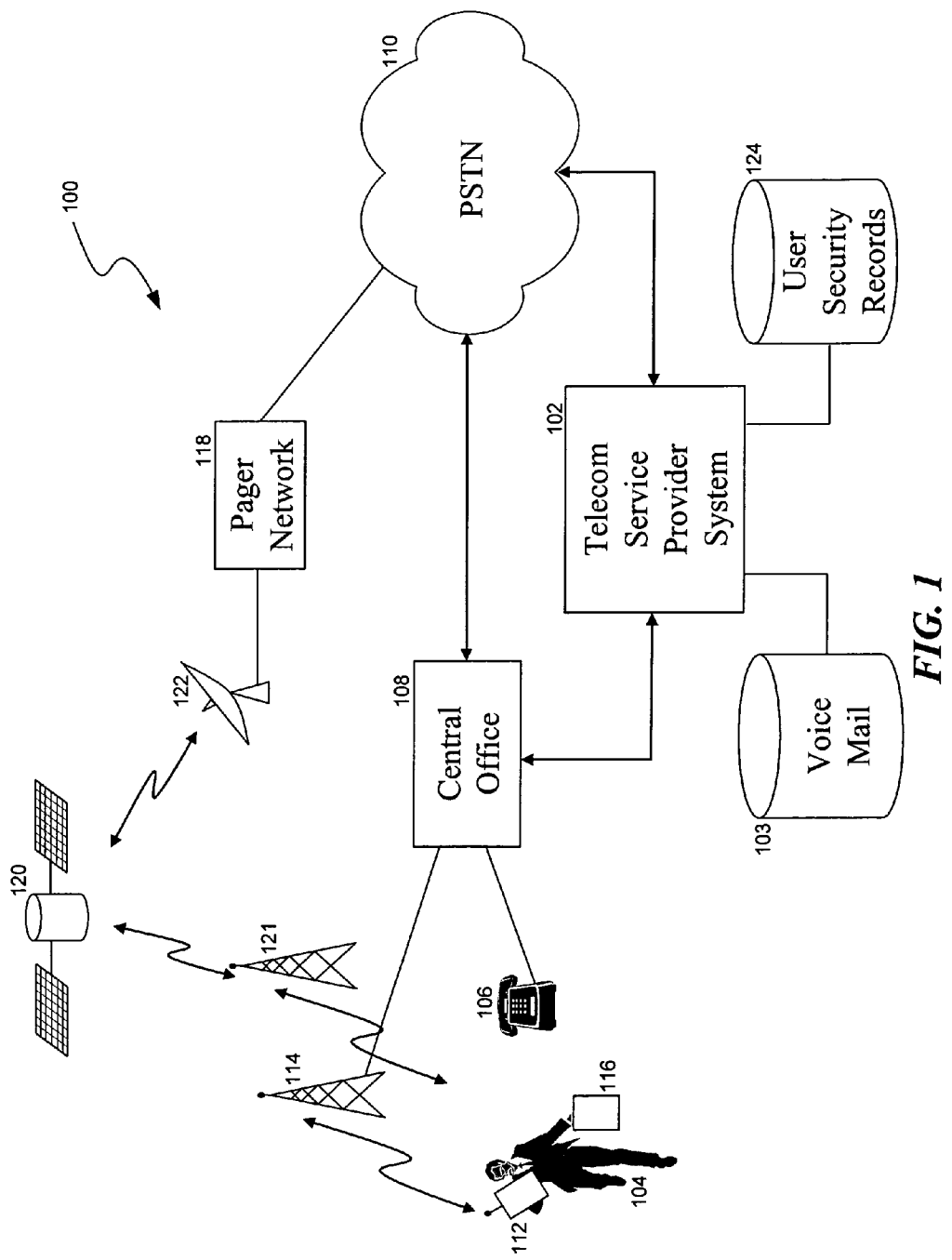
FIG. 1 is a block diagram of a suitable environment employing a dynamic security system under aspects of the invention.

In the drawings, identical reference numbers identify identical or substantially similar elements or steps. To easily identify the discussion of any particular element, the most significant digit or digits in the reference number refer to the Figure number in which that element is first introduced (e.g., step 304 is first introduced and discussed with respect to FIG. 3).

The headings provided herein are for convenience only, and do not affect the scope or meaning of the claimed invention.

DETAILED DESCRIPTION OF THE ILLUSTRATED EMBODIMENTS

A security system, and in particular, a method and apparatus for providing security and restricted access to a system or resources is described in detail herein. In the following description, numerous specific details are provided, such as specific algorithms, ordering of steps, questions, and the like, to provide a thorough understanding of, and enabling description for, embodiments of the invention. One skilled in the relevant art, however, will recognize that the invention can be practiced without one or more of the specific details, or with other algorithms, ordering of steps, questions and the like. In other instances, well-known structures or operations are not shown, or not described in detail, to avoid obscuring aspects of the invention.

As noted above, existing security systems are easily compromised if an unscrupulous person gains access to a subscriber's access or account number and PIN code, or security device such as an ID card. There is a need to not only prevent unauthorized access to electronic files or data, but unauthorized use of expensive resources. The inventors have discovered that there is a need for subscribers or users to encapsulate or hide important information from others, such that security is not compromised even if an unscrupulous person obtains the access number and PIN code or ID card or other hardware (e.g., laptop computer). In other words, security systems should employ a dynamic security code ("DSC"), rather than a static PIN code, but where such DSC may be readily understandable or available to a user, without requiring the user to frequently memorize changing codes, or memorize long strings of digits in a code. Such codes are dynamic, in that they change frequently, thus a third-party may obtain a user's current security code, but soon thereafter, the code will change and thus the security code obtained will be ineffective.

Furthermore, security systems typically lack modes or levels of security that may be selectable by the user. Use of typical PIN codes only allow the user to choose a longer PIN code to enhance security. However, longer PIN codes are more difficult to memorize, and are still susceptible to hacking or unauthorized access. The inventors recognize that there is a need for a security system that permits users to select higher levels or modes of security for certain situations, such as at a predetermined times, at predetermined locations, in response to certain data types, and the like.

Presented below are systems and methods that overcome problems discussed above, and provide numerous additional benefits. The systems described below provide proof, security and reliability, and minimize the cost of implementation. The below systems allow different security levels to be chosen by a subscriber, where increased security can be chosen and changed back to default at any time. The below described system reduces exposure to fraud if a static PIN is stolen, and relies typically on software and mathematical methods only, and therefore is less expensive and easier to implement than systems requiring specialized hardware. Some or all of the below described systems may be applicable to any number of environments requiring security, such as telecommunications companies, professional service providers such as doctors, lawyers and accountants, financial institutions such as banks and securities brokers, insurance companies, and any other number of industries who wish to provide an improved security system, but without expensive hardware or difficult to memorize or implement systems or security protocols.

Aspects of the invention are described below with respect to a telecommunications environment whereby users or subscribers have access to telecommunications services, such as voicemail, facsimile mail, email and the like, but wish to restrict access to only themselves, or to certain designated individuals. The systems employ a default and first level of security such as employing a PIN code. One or more increased levels or modes of security may be selected by the user. Such additional levels of security include (1) periodically generating and transmitting a random security code to the subscriber, such as via email or via a pager network; (2) a security algorithm employed by a server computer that generates security codes over a period of time, and where the subscriber knows the security algorithm and can readily generate the same security code generated by the server computer at any given time (e.g., a code consisting of the current month of year, time of day, day of month, and day of week); (3) providing a series of predetermined questions, where answers were previously provided by the user, and where the questions are provided in a shuffled fashion, and where only the subscriber will generally know the answers to such questions; (4) a voice fingerprint or voice pattern recognition method; (5) a matrix of random numbers (e.g., a five by five matrix), from which a user selects numbers from predetermined positions to generate a current security code; and (6) combinations of the above methods or features of these methods. Numerous additional details and examples are provided below.

Suitable System

Referring to FIG. 1, an example of a telecommunications system 100 is shown in which an embodiment of the security system may operate. A telecommunications service provider system 102 provides telecommunications services such as voicemail, stored in a database 103, to a user 104. The user 104 may access the voicemail database 103 via a telephone 106 that is coupled to the system 102 through a central office 108, or through the central office, to the public switched telephone network (PSTN) 110, and then to the system. The user 104 may also access the voicemail database 103 via a cellular or mobile telephone network, such as via a cell phone 112 coupled to the central office 108 via a cell site antenna 114. Of course, the cell-site antenna 114 may well be coupled to other subsystems or network components before being coupled to the PSTN 110.

Furthermore, the user 104 may employ a pager 116 that is coupled to the PSTN 110 via a pager network 118. The pager network 118 communicates with the pager 116 via a satellite 120 and terrestrial base station 122. The satellite 120 may initially communicate with a terrestrial antenna or station 121, that in turn provides radio frequency (RF) communication with the pager 116. Of course, many other paging architectures and systems are possible. The system 102 is coupled to a database 124 that stores a set of user security records, which identify various security parameters selected by the users, as described below. The system 102 may provide not only access to the voicemail database 103, but provide additional telecommunications services to the user, such as international, long distance, and local dialing, pager access, cellular phone access, and the like. An example of such a robust telecommunications service is provided by AccessLine Communications, of Bellevue, Wash.

Importantly, the system 102 provides one or more dynamic modes of security to restrict access to the voicemail database 103 such that only authorized users or subscribers may access their stored voicemail messages. Rather than employing simply a static personal identification number (PIN) security mode, users may select one of several security modes for improved security and further restrict unauthorized access to telecommunications services, such as stored voicemail messages (e.g., selecting between one of several dynamic security code generating algorithms). Of course, the telecommunications service provider system 102 need not only store voicemail messages for subscribers, but can also store additional information that may benefit from such improved security measures, such as facsimile mail, video mail, electronic mail, or any other data to which a user wishes to limit access, as described below.

The system 102 typically includes the server computer on which several routines described below execute. One primary difference between a standard server computer and that of the system 102 is that the server computer of the system 102 also includes call processing circuitry, such as a Dialogic card or other suitable circuitry or cards. Although not required, embodiments of the invention will be described in the general context of computer-executable instructions, such as routines executed by a general purpose computer, e.g., a server or personal computer. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers, and the like. The invention can be embodied in a special purpose computer or data processor specifically programmed, configured or constructed to perform one or more of the computer-executable instructions explained in detail below. Indeed, the term "computer," as generally used herein, refers to any of the above devices, as well as any data processor.

While not shown, the computers described herein, including the server computer forming part of the system 102, include one or more central processing units or other logical processing circuitry, memory, input devices (e.g., keyboards and pointing devices), output devices (e.g., display devices and printers), and storage devices (e.g., fixed and floppy magnetic disk drives, optical disk drives, card readers), all well known, but not shown. While shown as separate components, databases, such as the voice mail database 103, may form part of or be integral with the server computer. The computers may include other program modules not described herein, such as an operating system, one or more application programs (e.g., word processing or spreadsheet applications), and the like. Unless described otherwise, the construction and operation of the various blocks shown in the figures are of conventional design. As a result, such blocks need not be described in further detail herein, as they will be readily understood by those skilled in the relevant art.

The invention can also be practiced in distributed computing environments, where tasks or modules are performed by remote processing devices, which are linked through a communications network. In a distributed computing environment, program modules or subroutines may be located in both local and remote memory storage devices. Aspects of the invention described herein may be stored or distributed on computer-readable media, including magnetic and optically readable and removable computer disks, hard-wired or preprogrammed in chips (e.g., EEPROM semiconductor chips), as well as distributed electronically over the Internet or via other networks (including wireless networks). Processes or software components under aspects of the invention may be created under various ways, such as through source code programming, created as microcode or programmed logic arrays, or the like. Those skilled in the relevant art will recognize that portions of the invention reside on a server computer, while corresponding portions may reside on a client computer (e.g., with respect to the embodiment of FIG. 10). Data structures and transmission of data particular to aspects of the invention are also encompassed within the scope of the invention.

Initial Call Flow Procedures

Figure 2:
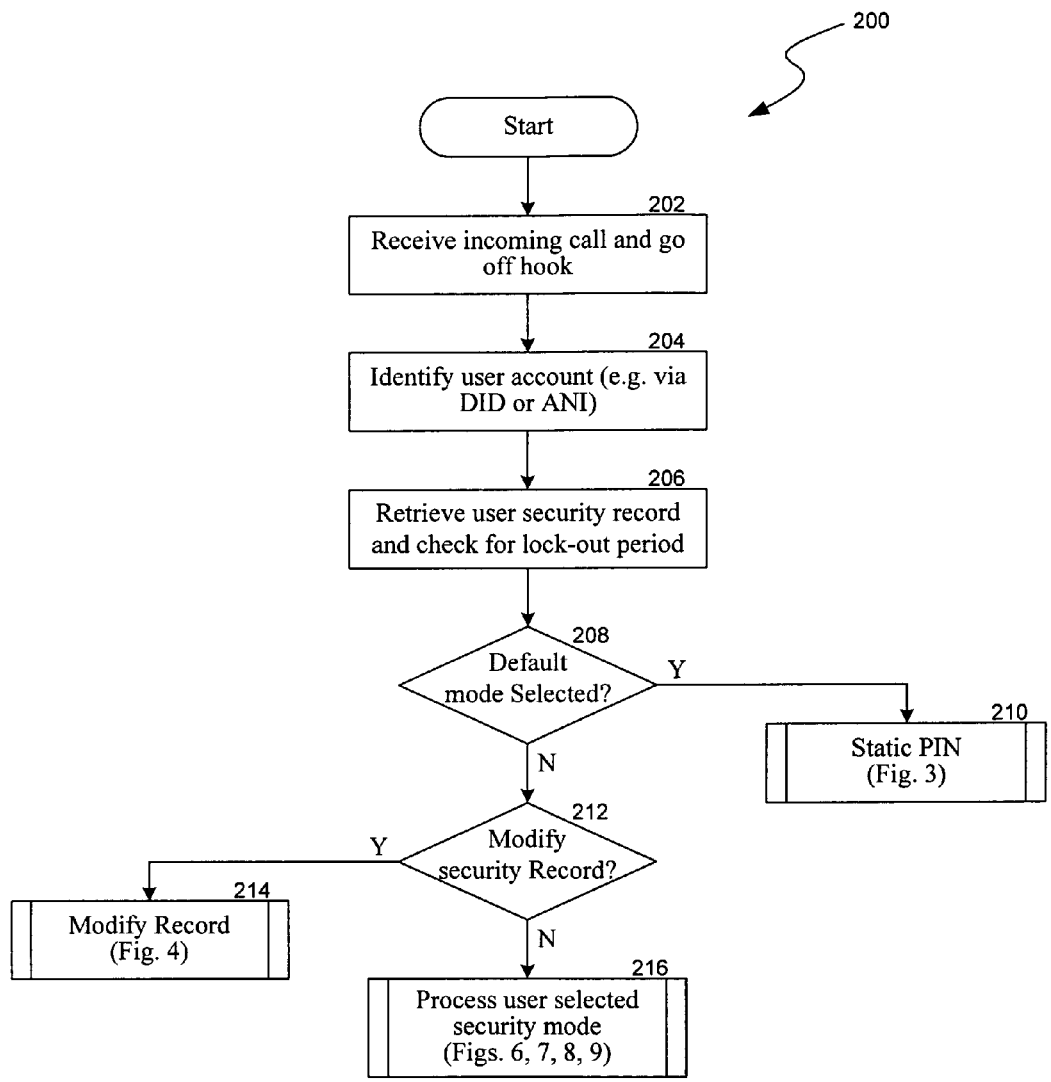
FIG. 2 is a flow diagram showing an incoming call disposal routine, such as for use by the system of FIG. 1.

Referring to FIG. 2, an incoming call disposal routine 200 is shown, which is performed by the system 102. Beginning in step 202, the system 102 receives an incoming call, such as from the user 104, and goes off hook (i.e., the system answers the call). In step 204, the system 102 identifies the user's account, such as via direct inward dialing (DID), dialed number identification service (DNIS), automatic number identification (ANI), or calling line ID (CLI). Alternatively, the system 102 may prompt the user to enter an account identifier code or login ID. In step 206, the system 102 retrieves the user's security record in the set of stored user's security records in the database 124 based on the identified user account or login ID. Additionally, in step 206, the system 102 determines whether a lock-out period is currently in effect. Lock-out periods are known in the art, and described below. If a lock-out period is currently in effect, then the routine 200 terminates.

In step 208, the system 102 determines whether a default security mode is selected. If so, then in step 210 a static PIN security mode is performed, which is described in greater detail below with respect to FIG. 3. If the default mode is not selected, then in step 212, the system 102 determines whether the user wishes to modify a security record based on user input. If so, then in step 214, the system 102 performs a modify security record routine, which is described in detail below with respect to FIG. 4. If not, then the system 102 processes one or more user-selected security modes, which are described in greater detail below with respect to FIGS. 6–9.

Figure 3:
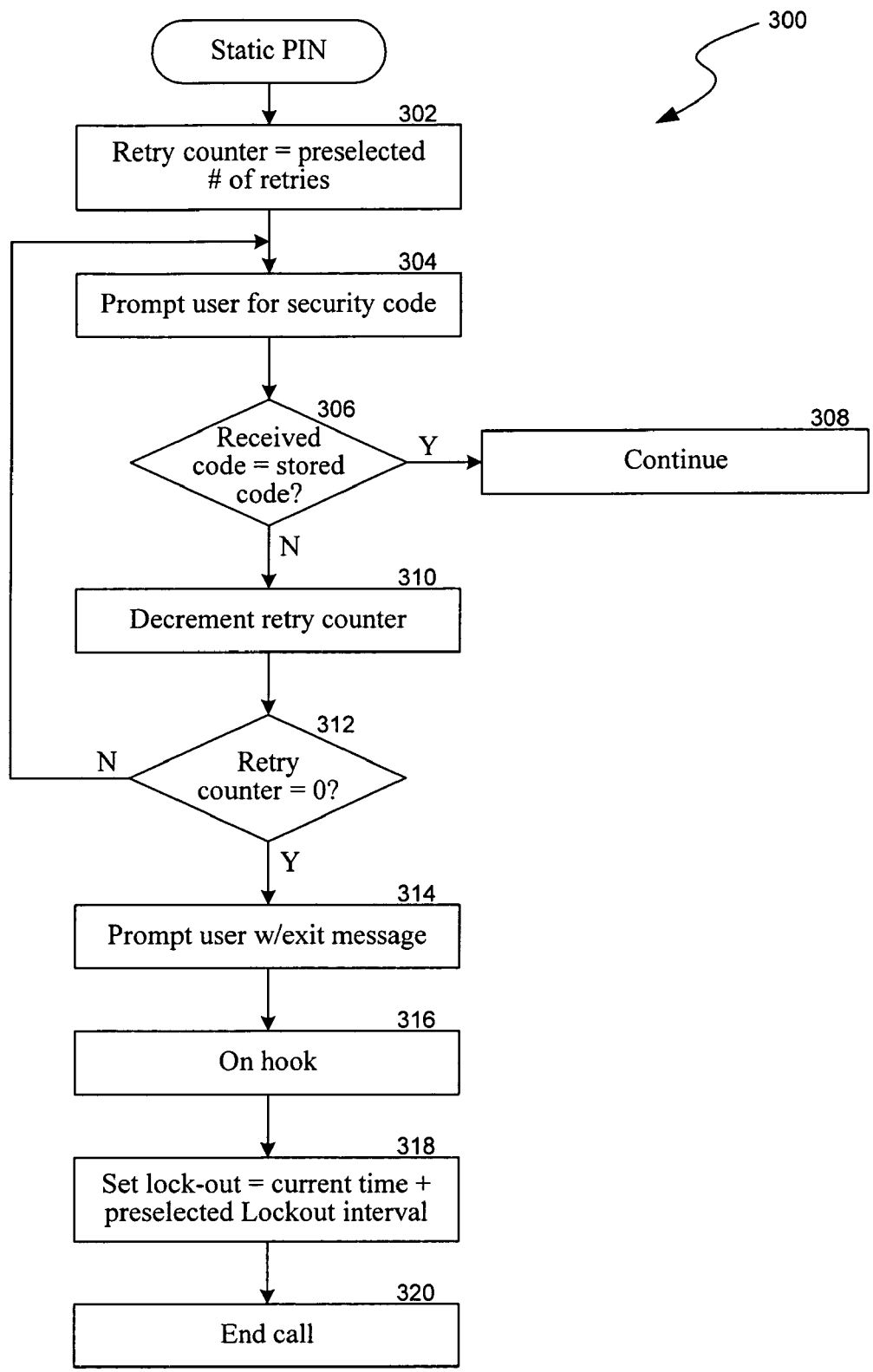
FIG. 3 is a flow diagram of a static PIN security method.

Referring to FIG. 3, a static PIN security mode routine 300 is shown. Beginning in step 302, the system 102 sets a retry counter equal to a preselected number of retries. A preselected number of retries may be selected by a user and stored in the user's security record, as noted below. In step 304, the system 102 prompts the user for a security code, such as a voice prompt script stating "Please enter your personal identification number." In step 306, the system 102 determines whether a code received as user input is equal to a stored PIN code for the user. If yes, then the process continues under step 308, whereby the user may access stored voice messages in the database 103, modify telecommunication services, or perform any number of other functions. Such additional details not described herein, as it will be understood by those skilled in the relevant art.

If the received code does not equal the stored PIN code, then in step 310, the system 102 decrements a retry counter. In step 312, the system 102 determines whether the retry counter equals or is less than zero. If not, then the routine 300 loops back to step 304. If the retry counter does equal zero, then in step 314, the system 102 prompts the user with an exit message, such as "Thank you; goodbye." In step 316, the system 102 goes onhook. In step 318, the system 102 sets a lockout period equal to the current time plus a preselected lockout interval period. For example, the preselected lockout interval can be one hour. Therefore, the lockout period is set to extend one hour from the current time. After the set lockout period, the user may retry entering a PIN under the routine 300, but not before. In step 320, the call ends and the routine 300 terminates.

User Security Records

Figure 4:
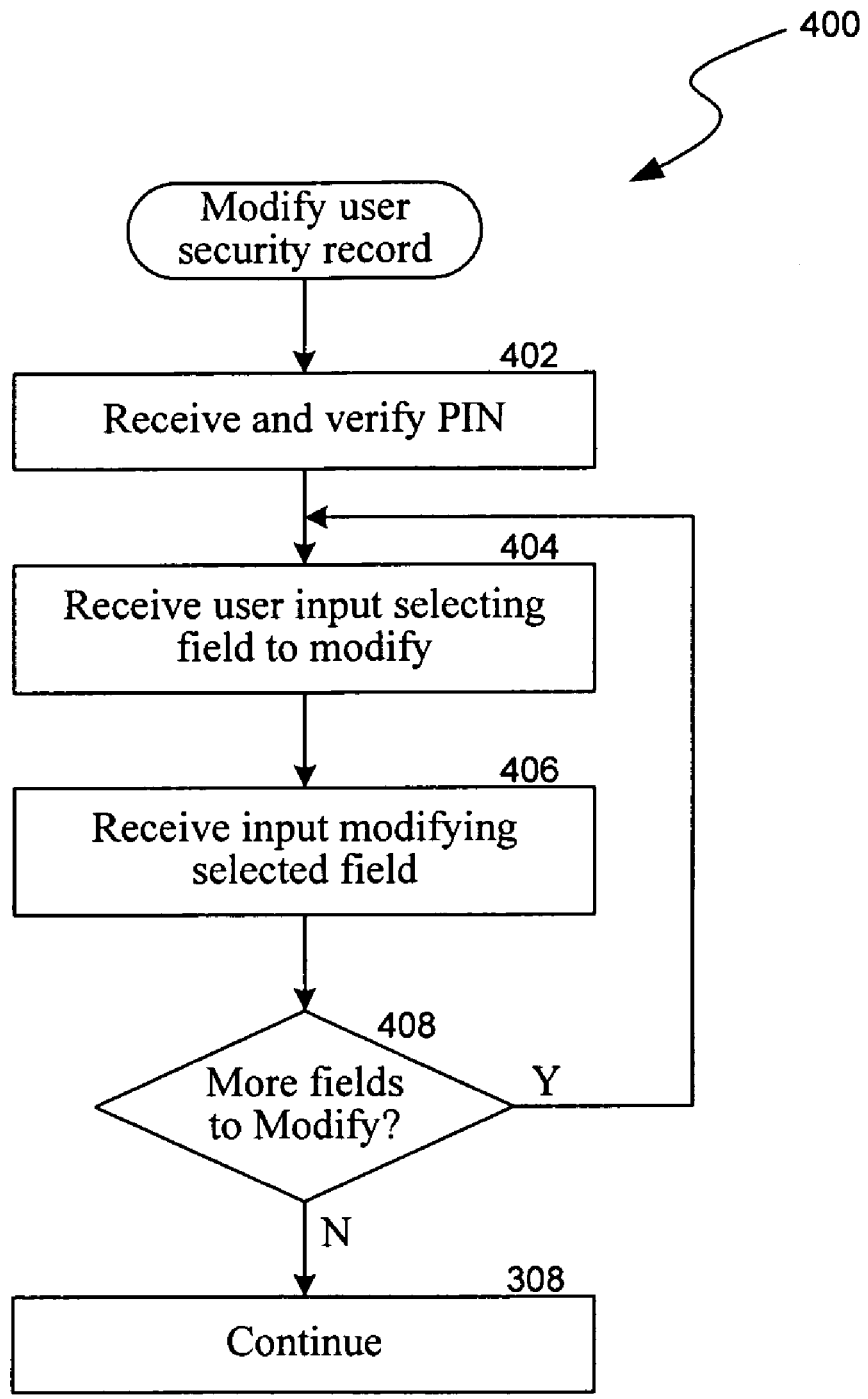
FIG. 4 is a flow diagram of a method for modifying a user's security record.
Figure 6A:
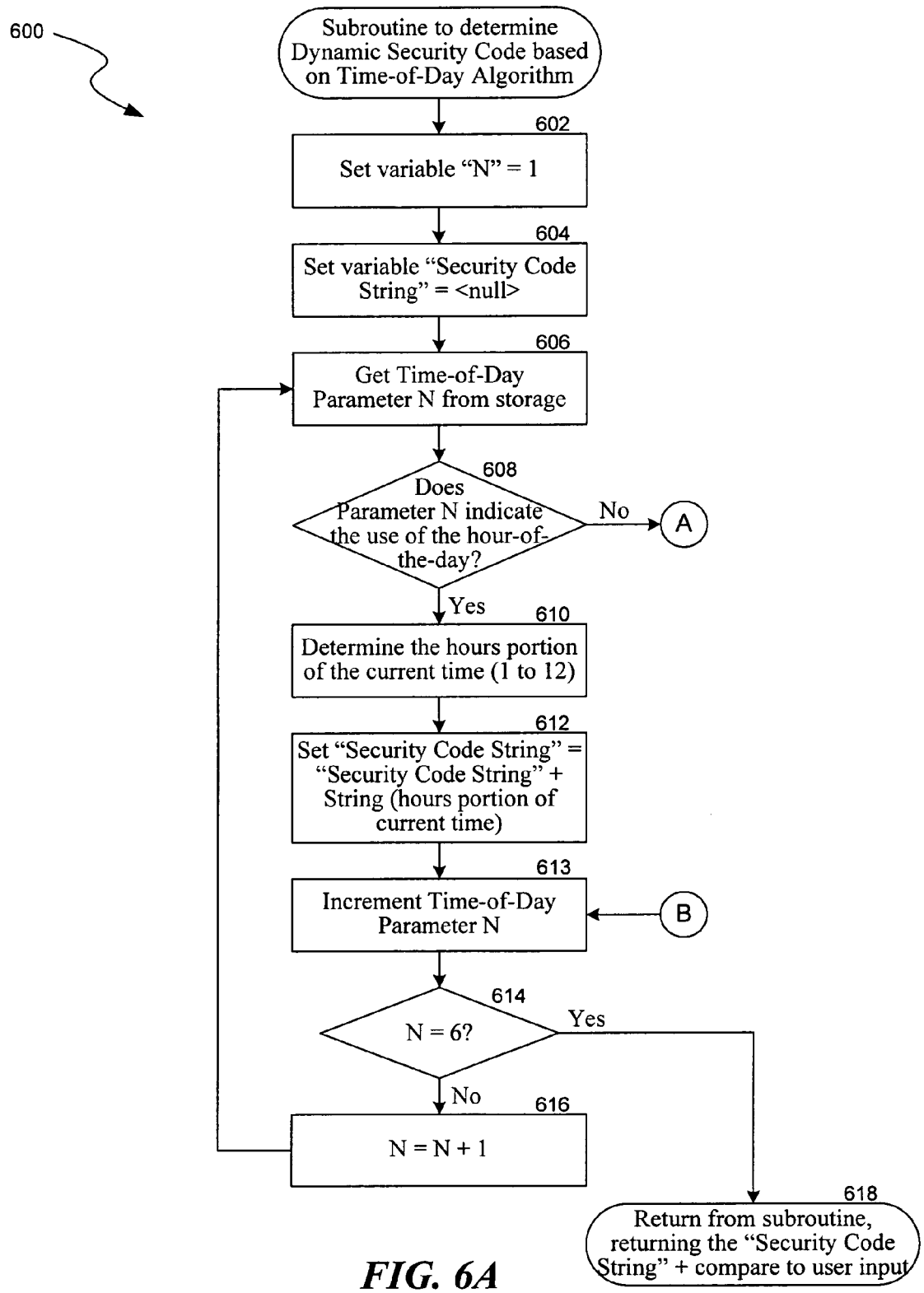
FIGS. 6A–6D are a flow diagram of a time of day dynamic security mode such as that employed by the system of FIG. 1.
Figure 6B:
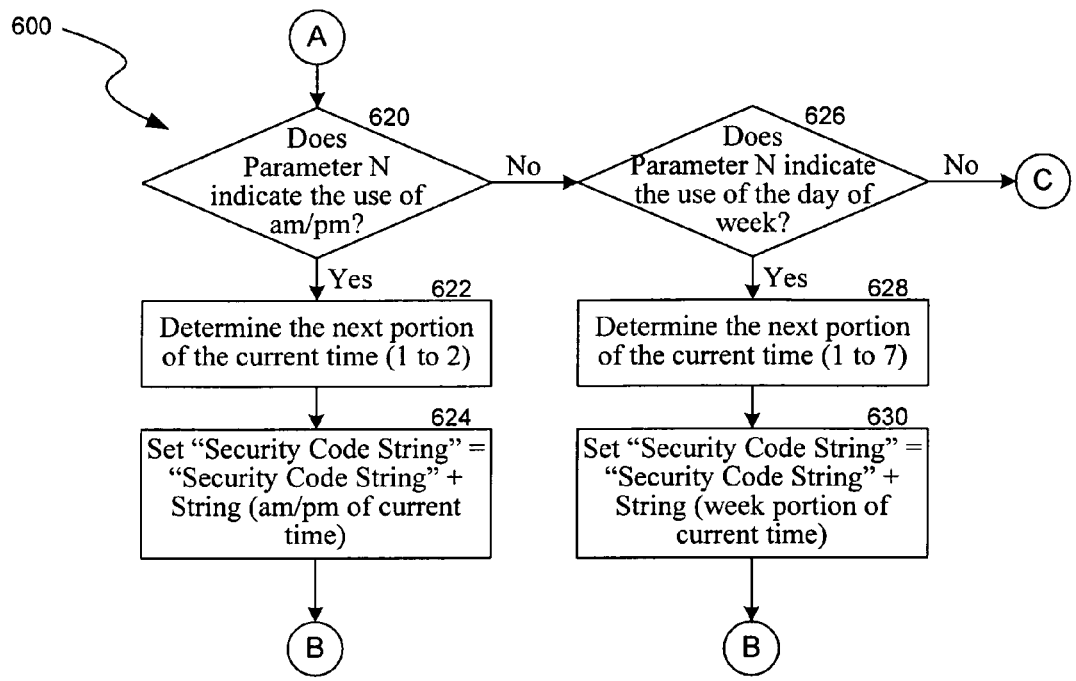
Figure 6C:
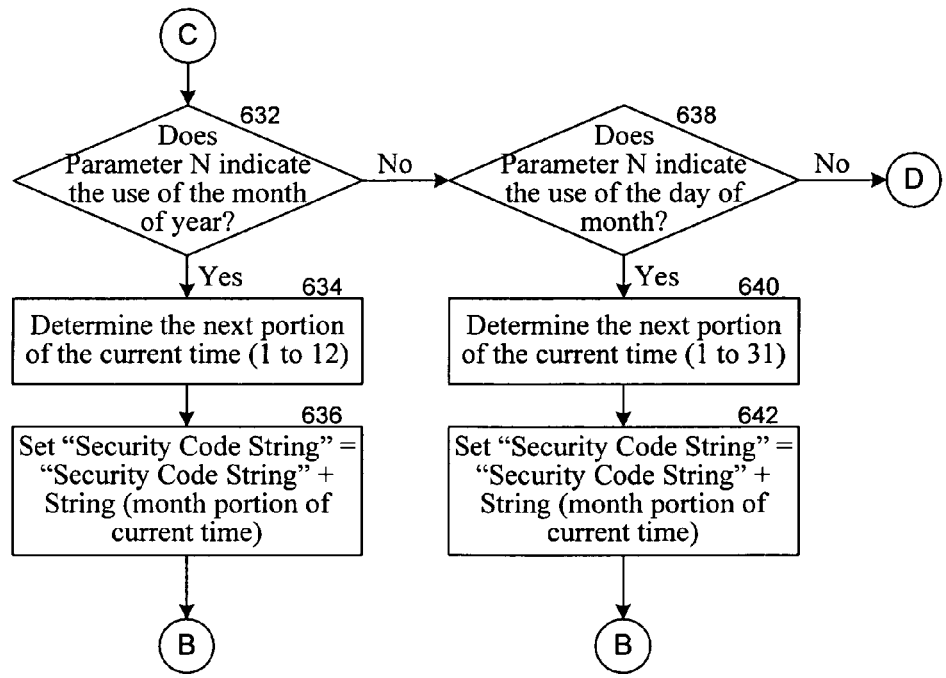
Figure 6D:
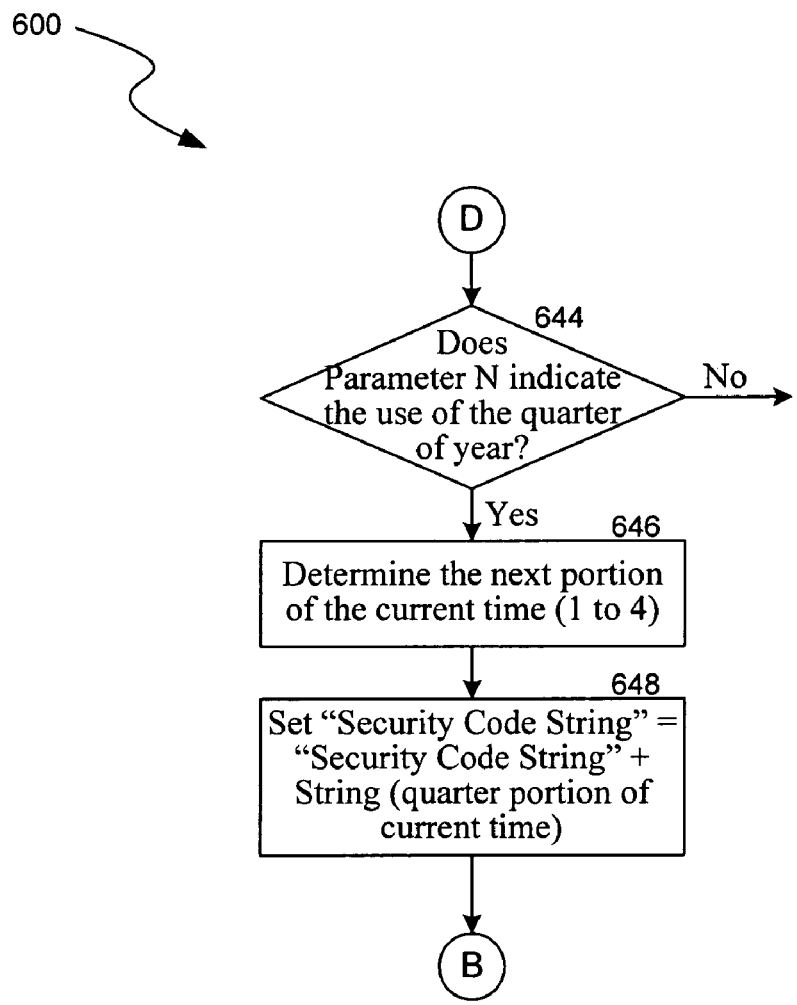

Referring to FIG. 4, a routine 400 for allowing a user to modify his or her security record is shown. Beginning in step 402, the system 102 receives and verifies the user's PIN code such as under the routine 300 above. In step 404, the system 102 receives user input selecting a field to modify. User input may be provided as pushbutton or dual-tone multi-frequency (DTMF) input, common on telephones. Alternatively, user input may be voice commands, where the system 102 employs speech recognition capabilities, known to those skilled in the relevant art. The system 102 may present a hierarchical series of menus to identify the various fields that the user may modify, such as a main menu listing security modes, with submenus associated with each security mode to modify, for example, retry values, code values, and other parameters noted below. In general, user input described herein may be of any form, not necessarily DTMF or voice command input. For example, user input may be of a graphical form (e.g., bit mapped, vector-based graphics, or matrix), where such user input is provided to the system 102 via an appropriate device, such as a palm top computer having a wireless connection to the system.

In step 406, the system 102 receives user input modifying the selected fields. For example, user input may modify a field by enabling a particular security mode. Thereafter, in step 408, the system 102 determines whether the user wishes to modify any additional fields. For example, the system 102 may provide an audible prompt to the user asking whether the user wishes to modify any additional fields. If so, then the routine loops back to step 404. If not, the process continues under step 308 (as described above).

FIGS. 5A and 5B together show an example of a user's security profile or record 500 stored in the database 124. Each field in the record 500 is shown as a row in FIGS. 5A and 5B with the first column in the row representing the name or identifier for the field, and the second column representing the value or data that that field identifier may take. For example, a record identifier field 502 includes the user's account number, such as the user's telephone number. Fields 504 through 512 represent whether any one of five security modes are enabled, and have corresponding binary values of yes or no, where the modes are: static security mode, dynamic time mode, dynamic pager code, dynamic interrogate, and voice fingerprint, respectively, all of which are described below. In one embodiment, only one of the five security mode fields 504 through 512 may be enabled at any one time. Under alternative embodiments, more modes may be simultaneously enabled, whereby a high security mode would employ all five security modes.

If the static security mode, field 504 is enabled, then a static PIN code field 514 includes the user's PIN number. In general, the static security mode employing PIN codes is a default security mode employed by the system 102. Fields 516 through 524 represent retry values for each of the five security modes 504 through 512, respectively. Each of the retry fields 516 through 524 may have an associated value between zero and some integer number K, where K is typically predetermined by the telecommunications service provider as a maximum number of retries. A zero value represents no number of retries are selected or permitted by the user.

Fields 526 through 536 represent first through sixth time of day parameter fields employed under a time of day security mode, which are discussed more fully below with respect to FIG. 6. Each of the time of day parameter fields 526 through 536 store or represent one of the following time of day parameters: hour of day (having a value between 1 and 12), AM or PM (having a value of 1 or 2), day of the week (having a value between 1 and 7), month of the year (having a value between 1 and 12), day of the month (having a value between 1 and 31) and quarter of the year (having a value between 1 and 4).

If the "pager" code security mode is enabled under field 508, then fields 538 through 548 typically have corresponding values. A code notification mode field 538 has one of two values representing whether the user wishes to be notified by pager or email of a current randomly generated code. A pager number 540 represents the pager number for the user's pager 116. An email address field 542 represents the user's email address. An optional code length field 544 indicates a length of a code generated under the pager code security mode, and it can have a value between 1 and an integer value J. A value of 1 indicates that only a single digit code is randomly generated at periodic intervals, while the value J represents a maximum number of digits for each code periodically generated. An optional code generation interval field 546 represents a frequency at which codes are randomly generated, and can have a value between 1 and L hours. A value of 1 indicates that codes are to be randomly generated by the system 102 every hour and transmitted or otherwise provided to the user, while L represents the largest period at which such codes are generated (e.g., weekly). A current code field 548 stores the currently generated random code.

Fields 552 through 560 represent standard or stock questions provided to a user when the user interrogation security mode is enabled in field 510. Fields 562 through 570 represent custom or personalized questions provided by and to a user under this same security mode. A question type field 550 indicates whether the user has selected a standard set of questions or has provided and prefers to be asked customized questions. Field 550 may have a third value indicating a combination of standard and customized questions. The standard set of questions include, for example, a social security number field 552 which represents and stores therein the user's social security number. Each question field 552 through 570 may also include an optional weighting. As explained below, the weighting is used to determine how often a question is asked to a user under the security mode. Other standard questions may include a date of birth field 554, home phone number 556, home zip code 558, and mother's maiden name field 560, with corresponding birth date, home phone number, home zip code and name data stored in the record 500. Note, the mother's maiden name field, while requiring an alphabetic answer, may be readily spelled out or entered using a telephone by spelling out the name using preassigned alphabetic characters to each digit (i.e., 2=ABC, 3=DEF, etc.). The custom questions may take any form and are provided by the user. For example, such questions may be "What are the ages of my children, in order?", "What is my dog's name?", "What is the zip code of my sister's house?" and the like. The fields 562 through 570 store not only the answers and optional weightings for these questions, but also include the questions themselves, such as being prerecorded as voice scripts or prompts by the user.

If the voice fingerprint security mode is enabled under field 512, then a voice data field 572 includes a voice fingerprint file for the user. The voice fingerprint data may be, for example, the user stating his or her name, which is stored as a sound file (e.g., a .wav file). Voice fingerprint or speech pattern profile technology is known to those skilled in the relevant art.

Voice mail or other data stored by the system 102 may be stored in encrypted format. If so, then fields 574 and 576 store data to permit the user to decrypt such files. A files encrypted field 574 identifies which files are encrypted (e.g., all voice mail, or voice mail from a particular number or received at a particular time), while a file encryption code field 576 stores corresponding encryption codes to decrypt such files. Such decryption codes may simply be the same code for all files. Additionally, such files may be encrypted using a current dynamic security code produced under one of the security modes described herein. As a result, each of such dynamic security codes generated under the various security modes described herein may be stored in the field 576, together with the file, files, or resources associated with or encrypted under such code.

The record 500 may include fewer fields in alternative embodiments employing less functionality, or include additional fields not shown. For example, a greater number of questions may be provided for standard and custom questions. Additionally, while aspects of the invention are generally described herein as providing security for access to a system or entire set of stored data, various security modes may be selectively applied to individual files, or sets of files or other resources. Thus, the user security record 500 may include additional fields to identify particular resources and whether one or more of the security modes are employed to improve security measures for accessing such resources. For example, a user may wish to provide enhanced security for voice mail messages received and stored during a predetermined time period (e.g., voice mail received during normal business hours), or received from a predetermined source (e.g., voice messages received from a set of predetermined telephone numbers, or all voice messages left by personnel internal to the company). Alternatively, or additionally, the user may wish to provide enhanced security based on data type (e.g., all facsimile mail receiving a higher security mode than voice mail). As a result, the user security record 500 will include additional fields to assign security modes to such individual resources, as described more fully herein.

Time of Day Security Mode

Referring to FIG. 6, a time-of-day security mode routine 600 is shown. Beginning step 602, the system 102 sets a variable N equal to 1. In step 604, a variable "Security Code String" is set to a null value. In step 606, the system 102 retrieves from the user's security record the first time-of-day parameter value in field 526.

In step 608, the system 102 determines whether the retrieved time-of-day parameter is set to the hour of the day. If so, then in step 610, the system 102 determines the hours portion of the current time (a value between 1 and 12 corresponding between 1 and 12 o'clock). In step 612, the system 102 sets the Security Code String equal to the current value of the Security Code String plus an additional string representing the hours portion of the current time. Thus, if the Security Code String has a null value, then the first value in the string is set to a value between 1 and 12. In step 613, the system 102 increments the time-of-day parameter N such that the next time-of-day parameter field in the user's security record 500 (e.g., field 528) is to be retrieved (under the next iteration of step 606).

In step 614, the system 102 determines whether the variable N is set to 6. If not, then the value N is incremented by one. If it is equal to 6, indicating that all six parameters for the time-of-day security mode have been established for the Security Code String, then in step 618 the routine 600 completes setting of the Security Code String and compares such string to user input. If the user input is equal to the Security Code String, then the user is authorized and the process continues under step 308 (not shown in FIG. 6).

If in step 608 the system 102 determines that the current parameter N does not indicate the hour of the day, then in step 620 the system determines whether the current time-of-day parameter indicates use of AM or PM. If so, then in step 622, the system 102 determines the next portion of the current time (a value of 1 or 2 corresponding to AM or PM). In step 624, the system 102 sets the Security Code String equal to the current value of the Security Code String plus a value equal to the AM or PM value of the current time. Following step 624, the routine 600 loops back to step 613 where the time-of-day parameter N is again incremented.

If the current time-of-day parameter N does not indicate AM/PM under step 620, then in step 626 the system 102 determines whether the parameter indicates use of the day of the week. If so, then in step 628, the system 102 determines the next portion of the current time (representing the day of the week, having a value between 1 and 7 corresponding to Sunday through Saturday). In step 630, the system 102 appends the day of week value from step 628 to the current value of the Security Code String, and then loops back to step 613.

If the current time-of-day parameter does not correspond to the day of the week under step 626, then in step 632 the system 102 determines whether the parameter corresponds to the month of the year. If so, then in step 634 the system 102 determines the current month of the year (for January through December corresponding to values 1 through 12). In step 636, the system 102 again appends the value 1 through 12 to the current value of the Security Code String, and then loops back to step 613.

If the current time-of-day parameter N does not indicate use of the month of the year under step 632, then in step 638 the system 102 determines whether the current parameter indicates use of the day of the month. If so, under step 640 the system 102 determines the current day of the month, corresponding to a value between 1 and 31. In step 642, the system 102 appends the value between 1 and 31 to the current Security Code String, and then loops back to step 613.

If the system 102 determines in step 638 that the current time-of-day parameter does not indicate day of the month, then in step 644 the system 102 determines whether the parameter indicates use of the quarter of the year. If the parameter does not indicate quarter of the year; then an error must have occurred, and an error flag is generated, because quarter of the year is the last option available for the six time-of-day parameters under fields 526 through 536. If it does indicate use of quarter of the year, then in step 642 the system 102 determines the current quarter of the year (corresponding to a value between 1 and 4) and appends this value to the Security Code String under step 648 before looping back to step 613.

Under routine 600, the system 102 sequentially analyzes each time-of-day parameter field 526 through 536 in the user's security record to determine if it indicates use of hour of the day, AM/PM, day of the week, month of the year, day of the month, and quarter of the year, in this order. Therefore, if the first time-of-day parameter field 526 in the user's security record 500 were set to quarter of the year, then the system 102 would perform the following steps, in the following order: 602, 604, 606, 608, 620, 626, 632, 638, 644, 646, 648, 613, 614 and 616, before looping back to step 606 and then retrieving and analyzing the second time of day parameter field 528. If the second time-of-day parameter field 528 indicated use of day of the week, then the system 102 would perform the following steps in the following order: 606, 608, 620, 626, 628, 630, 613, 614 and 616, before looping back to step 606. Of course, many other routines for determining the current time of day for the six primers to determine a final value of the Security Code String may be employed.

The above time-of-day security mode routine 600 generates a dynamic security code (DSC) that changes as frequently as once an hour. Every day begins by changing at least four digits in the DSC, every month begins by changing five digits in the DSC, and every quarter, six digits change. Two digits change once per day (a.m./p.m.) and one digit changes hourly in the DSC. Since an eavesdropper does not know the order of in which a user inputs the various time-of-day parameters, the eavesdropper will not know the DSC next hour, and within the span of a day, the DSC will change enough to provide substantially enhanced security over standard PIN based security modes. Thus, a PIN is a static or constant variable typically given to a subscriber once, while the DSC is a dynamic "virtual" variable, that is never the same over a period of time. Other algorithms are possible that do not rely on the time of day, are possible, as described below.

Periodic Security Code Transmitted to User

Figure 7:
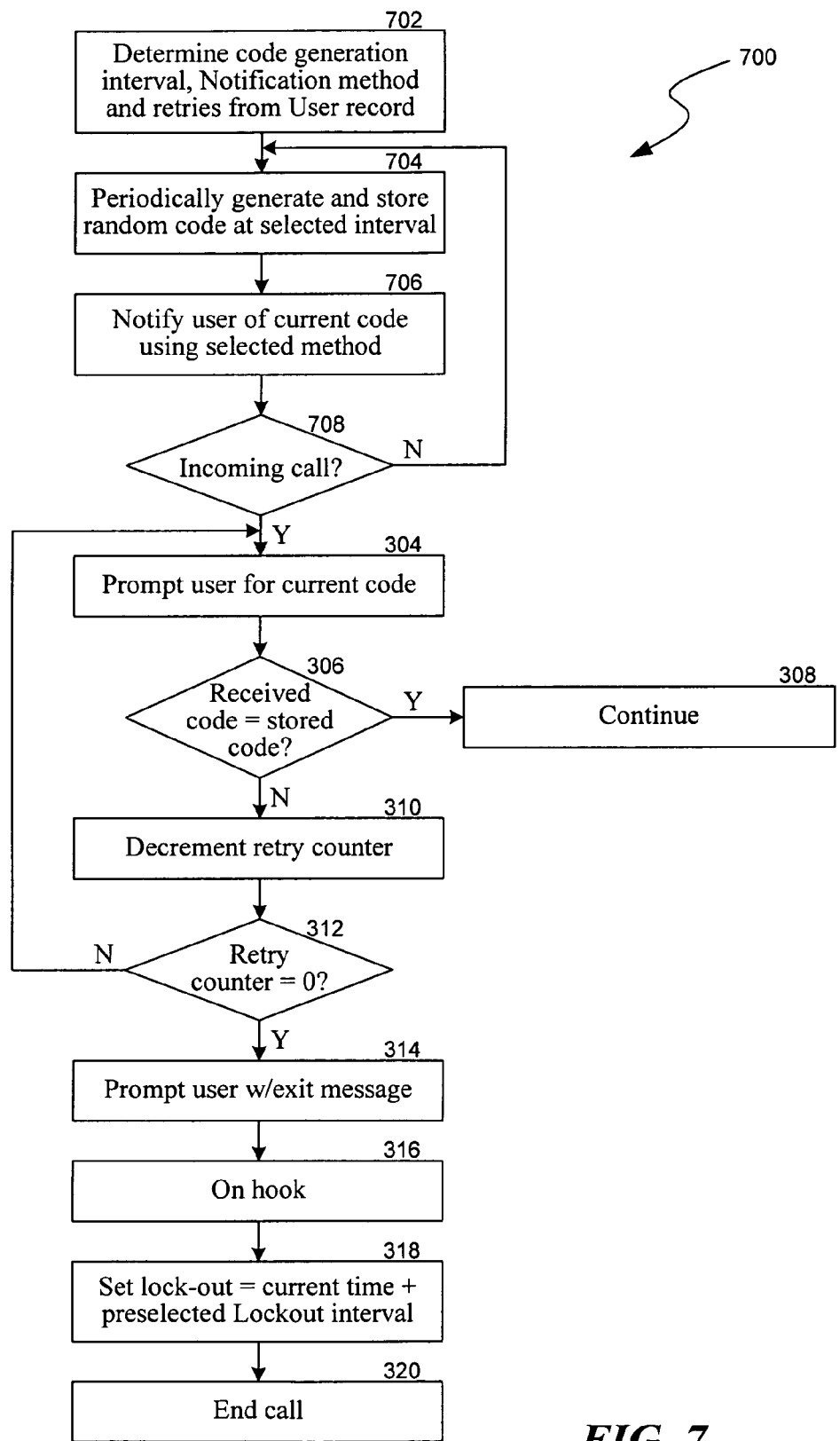
FIG. 7 is flow diagram of a dynamically generated code method that is communicated to a user such as under the system of FIG. 1.

Referring to FIG. 7, a periodic code generation and user notification security mode routine 700 is shown, where the periodic code or DSC is a randomly generated code employed by the system 102 and whose value is periodically transmitted to the user. Beginning with step 702, the system 102 retrieves the user's code notification mode field 538, and other relevant fields, such as pager code retry field 520, code generation interval field 526 and/or code length field 544. Under step 702, the system 102 also analyzes the code identification mode field 538 to determine whether the user has selected to be notified by pager or email. If by pager, then the system 102 retrieves the user's pager number field 540, while if by email, the system retrieves the user's email address field 542. Of course, under an alternative embodiment, the system 102 simply notifies the user by pager (or email).

In step 702, the system 102 periodically generates and stores a DSC or random code at a selected interval. If the user has selected a preferred code generation interval based on field 546, then the system 102 may generate and transmit such codes to the user at the user's desired interval (e.g., once per hour). As a default, the system 102 may simply generate such random codes only once per day. Additionally, if the user has selected a preferred code length under the code length field 544, then the system generates a code for the user of the desired length (e.g., three digits long). The system stores the generated code in the user's current code field 548 for later retrieval.

Under an alternative embodiment, the user does not have an option to specify a preferred notification mode, code length or code generation interval. Instead, under such alternative embodiment, such variables are set by the system 102, so that the code length and code generation interval are predetermined by the system and the user is notified by only one method (e.g., via a pager network). As a result, the system 102 may simply generate a single code transmitted to all users or subscribers at a set interval. This alternative, however, may be less secure and provides less options to a user.

In step 706, the system 102 notifies the user of the current code previously generated under step 704 using the user's desired notification mode. For example, if the user wishes to be notified by pager, then the system 102 contacts that pager network 118 to send the generated code to the user's pager 116 (FIG. 1). The code may then be perceived and temporarily stored in the user's pager 116, so that the user may recall the code at any time he or she wishes to access the system. If the user wishes to be contacted by email, then the system 102 automatically generates an email message to the user and sends such email to the user's email address (as described more fully herein).

Under step 708, the system 102 determines whether an incoming call is received. If so, then the system 102 performs steps 304 through 320 in a manner similar to that described above with respect to FIG. 3. In other words, the system 102 under step 304 prompts the user for the current code, and under step 306 determines whether the user's input code is equal to the current code stored in the current code field 548. If so, then the process continues under step 308, and if not, the retry counter is decremented under step 310. Steps 312 through 320 are substantially similar to that described above. Indeed, steps 310 through 320 represent a "retry loop," which is noted below.

Under an alternative embodiment, the code may be sent in an encrypted or scrambled fashion using a simple cryptographic algorithm that may be easily memorized and mentally performed, such as a simple transposition (e.g., the first and last digits in the random code are switched before being transmitted to the user). The user simply memorizes this algorithm, and can, in his or her head, simply perform the decryption algorithm to determine the DSC. Under this alternative embodiment, if a third party stole or acquired the user's pager 116, the third party still could not be able to access the system 102 without knowing the simple algorithm. The user 104 may initially establish with the system several algorithms such as one or more of the following:

1. Transposition: rearranging digits in the transmitted code, for example, moving the first two digits in the code to the end (e.g., the transmitted code "12345" is modified by the user to become the true DSC of "34512").

2. Simple mathematical algorithms: adding, subtracting or performing other simple mathematical functions to the transmitted code to produce the true DSC (e.g., adding the last two digits so that the transmitted code "12345" is modified by the user to become the true DSC of "1239").

3. Duplicating/omitting digits: duplicating, omitting or a combination of both applied to one or more digits in the transmitted code to produce the true DSC (e.g., duplicating the first digit and omitting the last digit such that the transmitted code "12345" is modified by the user to become the true DSC of "11234").

4. Adding additional code: The user provides a previously stored code that is prepended, postpended or inserted to the transmitted code to produce the DSC. In other words, the user previously stores in his or her record 500 a short code or code subset that is added to the transmitted code (e.g., the user stores the code subset "789", which is to be inserted after the first two digits of the transmitted code, such that the transmitted code "12345" is modified by the user to become the true DSC of "12780345").

5. Historical codes: The user's pager stores previously transmitted codes, and the user knows which previous code to use at any given moment (e.g., codes are transmitted hourly and stored in the pager 115, and the user knows to use the code transmitted two hours ago, such that while the transmitted code is "1234", the code sent two hours ago is "67890", which is the true DSC to currently use).

Of course, other simple encryption algorithms may be employed with the transmitted code to produce the true DSC. The user may specify in his or her record which of the several algorithms to employ. Alternatively, the user may identify a particular day of the week for each mode (e.g., mode 1 for Mondays, mode 2 for Tuesdays, . . . ). Under a further alternative, the system 102 may transmit a mode number, together with the transmitted code. For example, the system 102 may transmit to the user's pager 116, the code "112345", where the first digit indicates the mode to employ to generate the true DSC (i.e., mode 1 in this example). The user may initiate, establish and modify modes using his or her telephone or via a computer employing a web interface as describe below.

User Interrogation Security Mode

Figure 8:
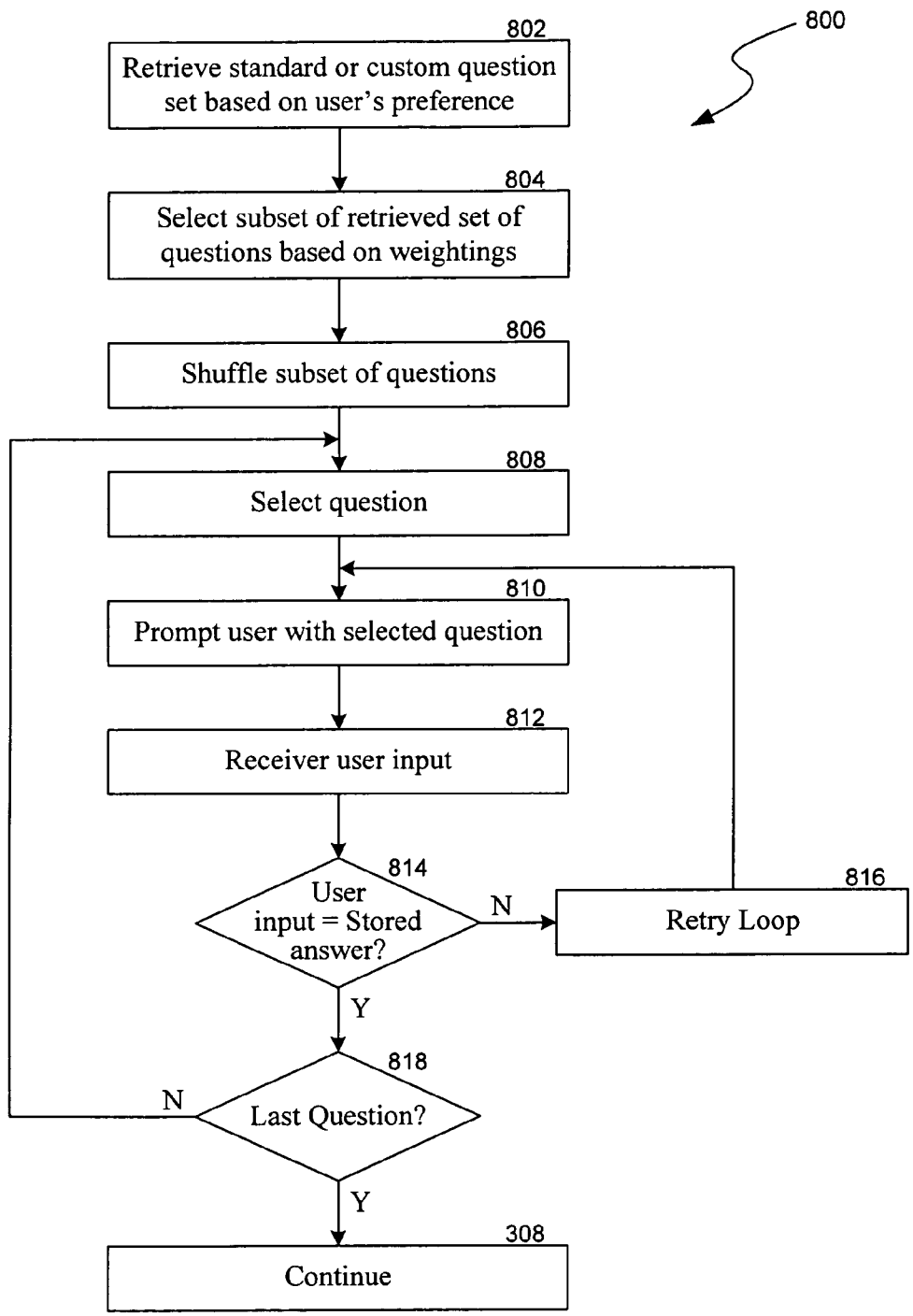
FIG. 8 is a flow diagram of a user interrogation security mode.

Referring to FIG. 8, a user interrogation security mode routine 800 is shown, where the system 102 asks several questions to the user that generally may be only correctly answered by the user. Beginning in step 802, the system 102 initially determines whether the user prefers to employ the standard set of questions, the user's customized or personalized set of questions or a combination of the two, based on the question type field 550. Thereafter, the system 102 retrieves either the standard question fields 552 through 560, or custom question fields 562 through 570 in user security record 500.

In step 804, the system 102 selects a subset of the retrieved set of questions based on the user's weightings. For example, if the user has selected to use the standard set of questions, and assigned a weighting of zero to the social security number field 552, then the system 102 never prompts the user to enter his or her social security number. Alternatively, if the user has assigned a weighting of "M" to the home zip code field 558, then the system 102 always selects the home zip code question under step 804 and thus always prompts the use to enter his or her home zip code. Thus, the system 102 under step 804 may select the home zip code, date of birth and mother's maiden name questions from the standard question fields 552 through 560 to generate a subset of questions.

Under an alternative embodiment, the system 102 does not select a subset of questions, but simply uses all of the user's standard or customized questions. In yet another alternative embodiment, the system employs only custom (or customized) questions. In yet another embodiment, the system may create its own unique set of questions by using the data inherent in the existing questions. For example, the system may ask the user "please enter the first and last digits of your social security code, followed by the month you were born."

Under step 806, the system 102 then shuffles the subset of questions so that the questions are not presented in the same order each time to the user. Anyone eavesdropping or other unscrupulous individual attempting to learn the code entered by the user in response to the questions may be successful in obtaining a code one day, but the set of questions and the order in which the questions are asked on another day will likely be different, and thus a code learned one day would be useless the next day.

Under step 808, the system 102 selects the first question in the subset of questions during a first iteration of the loop noted below. In step 810, the system 102 prompts the user with the selected question. For standard questions, they may be stored in a location separate from each user's security record, since each user employs the same standard questions. However, with custom questions, the system 102 under step 810 retrieves the user-generated question from the appropriate custom question field 562 through 570. In step 812, the system 102 receives user input, and under step 814 determines whether the user's input corresponds to the answer stored in the user security record 500. If not, then the system 102 performs a retry loop under step 816. The retry loop corresponds substantially to steps 310 through 330 of FIG. 3. If the user's input does correspond to the stored answer, then in step 818 the system 102 determines whether the last question has been asked. If not, the routine 800 loops back to step 808, and the system selects the next question in the shuffled subset of questions. The process continues through steps 808 through 818 until the last question is correctly answered and the process continues under step 308.

The user interrogation security mode routine 800 has the benefit that the user need not recall any additional information beyond that which the user already presumably knows. Therefore, the user need not memorize lengthy PIN codes or other arbitrary/random codes, and yet still maintains the benefits of a dynamically changing PIN. Numerous additional questions algorithms for querying a user for information may be employed.

Voice Fingerprint Security Mode

Figure 9:
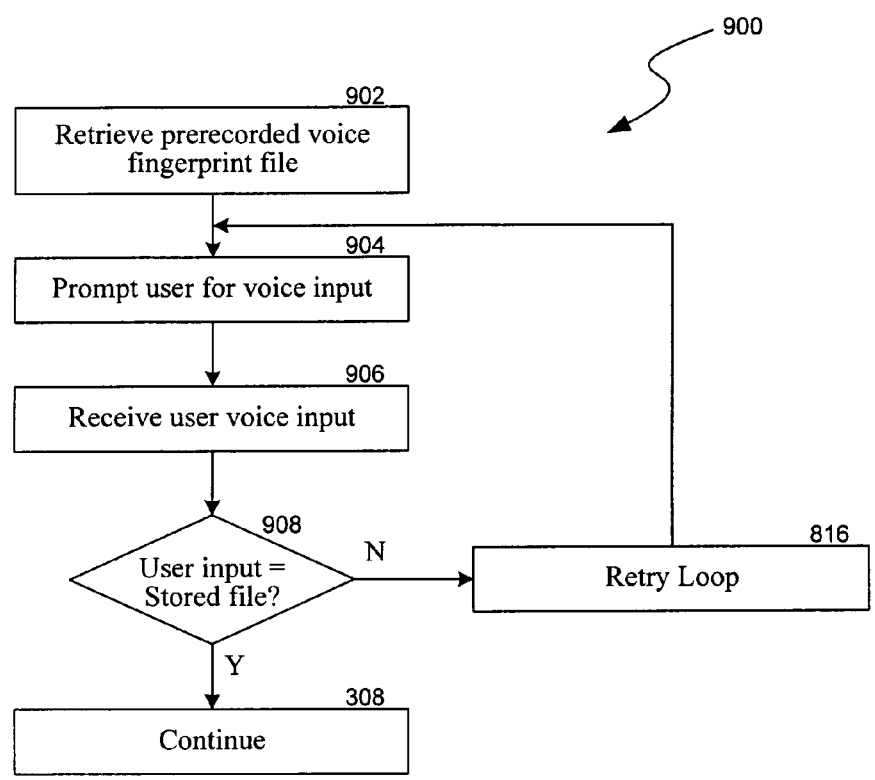
FIG. 9 is a flow diagram of a voice fingerprint comparison security mode.

Referring to FIG. 9, a voice fingerprint security mode process 900 is shown. Voice finger print recognition security systems are currently quite difficult to breach, and thus the voice finger print security mode may be a highest level of security employed by the system 102. Under such a system, the user may be initially requested to recite a chosen word several times. The system 102 stores each recited word, and employs signal analysis techniques to identify common time, frequency and energy domain aspects or wave forms common among them to be used as the voice finger print file stored under field 572.

Beginning in step 902, the system 102 retrieves the user's pre-recorded voice fingerprint file from the voice data field 572 and the user's security record 500. In step 904, the system 102 prompts the user for voice input. For example, the system 102 replays a voice script stating, "Please state your name." In step 906, the system 102 receives the user's voice input in response to the prompt, and stores such input. In step 908, the system 102 compares the received user input to the stored voice fingerprint file in field 572 corresponding to the user's own spoken name. If the two fail to correlate, then the system 102 performs the retry loop 816. If the two do correlate, then the process continues under step 308. Methods of recording and comparing voice fingerprint data are known to those skilled in the relevant art, and need not be described in further detail herein.

Under an alternative embodiment, the system 102 requires the user to speak several words, such as "play," "start," or "hello," all of which may be stored in the user security record 500. The system 102 may then request the user to say one of these words, which are selected at random. The system 102 may not prompt the user to speak one of these words, but the user knows that on a given day, a particular one of these words is to be spoken. Thus, the user need only memorize a simple algorithm for determining which of the several words to speak for voice finger print recognition.

Additional Alternative Embodiments

Figure 10:
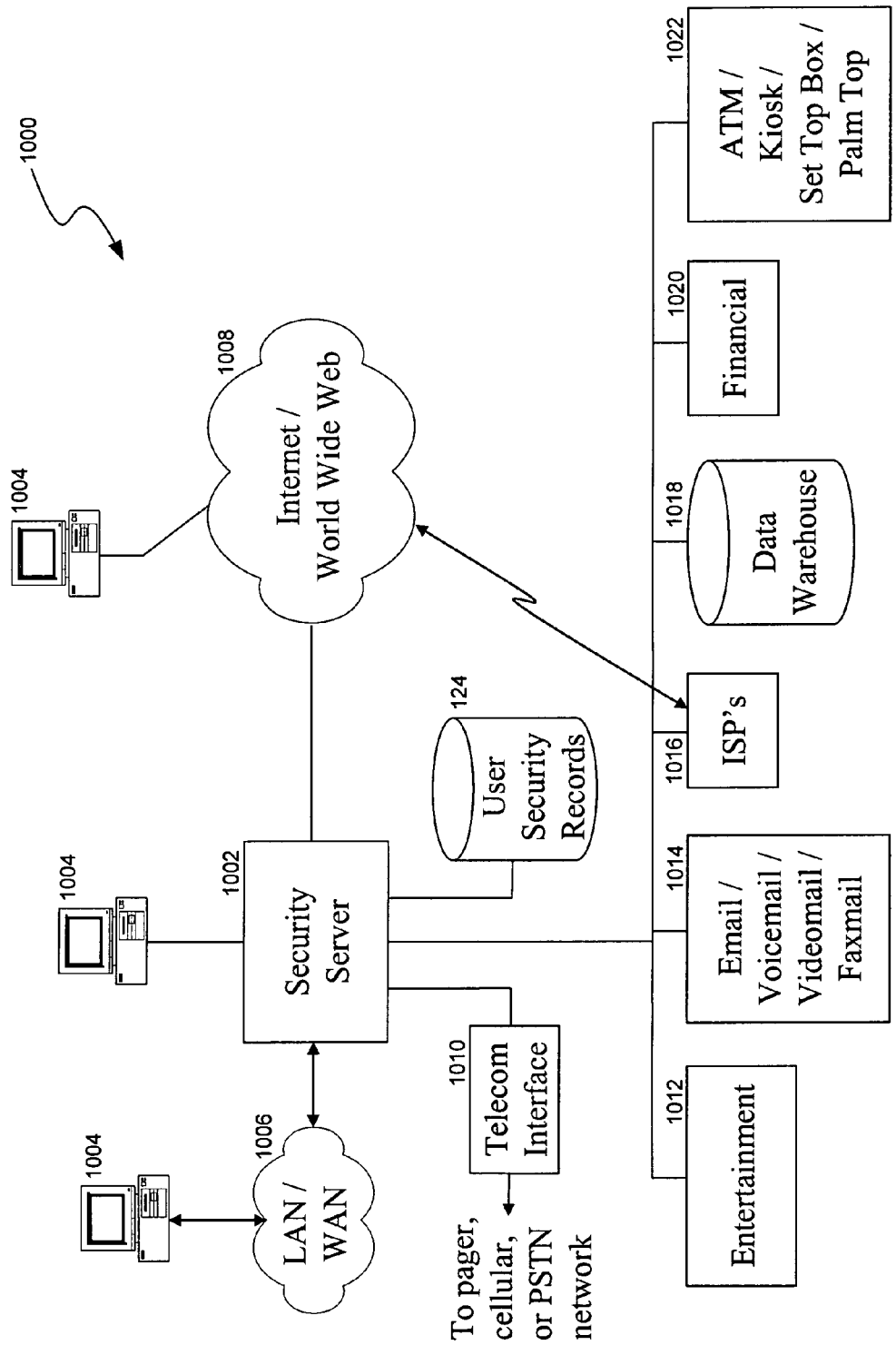
FIG. 10 is a block diagram of an alternative embodiment to the system of FIG. 1.

Referring to FIG. 10, the system 1000, according to an alternative embodiment, is similar to the system 100 of FIG. 1, but employs a security server 1002, instead of the telecommunications service provider system 102. In general, all alternative embodiments described herein are substantially similar to previously described embodiments. Only significant differences in construction or operation are described in detail.

While the system 100 and aspects of the various security modes are described with respect to a telecommunications environment, such security systems may be readily adapted to other environments, such as a networked computing environment. Under the system 1000, the security server 1002 provides user-selectable and dynamic security modes to client computers 1004, that may access the security server directly, via a local area network (LAN) or wide area network (WAN) 1006, or through the Internet or World Wide Web 1008. The security server 1002 stores user security records in a data base 124 in a manner similar to the system 102. User input by the client computers may be in any form, such as alpha numeric characters in ASCII or Unicode format, voice commands, graphical input or any other format. Graphical input, for example, may represent dynamic security codes formed as a series of shapes, e.g., a triangle, square, and circle sequence drawn by a user on a palm top computer, where such bitmap or vector images are then transmitted to the security server 1002 for user authentication.

The security server 1002 provides users with appropriate access to a variety of data, services, facilities, or "resources." Examples of some resources are shown as blocks in FIG. 10, which include entertainment resources 1012 (e.g., video on demand movies, music, etc.); email, voicemail, videomail, fax mail, or other stored records 114; access to Internet service providers (ISPs) 1016; data stored in remote locations under data warehousing environments 1018; financial data 1020, such as bank records, stock transactions, etc.; and, specialized data platforms, such as automated teller machines (ATMs), set top boxes, such as those used with televisions and coaxial cable networks, palm top or wearable computers, data kiosks, and the like. The security server 1002 may also provide access to various telecommunications services described above, including pager, cellular, or PSTN networks via a telecommunications interface 1010. The resources 1012 through 1022 may each employ their own security server 1002 to restrict access to only authorized users. For example, an Internet service provider 1016 may employ the security server 1002 to restrict access to only authorized users by employing any of the above security modes.

In general, the security server 1002 performs the same processes described above with respect to FIGS. 2 through 9, except an incoming call is instead an incoming transmission requesting access to a resource by a user. Thus, the flow diagrams discussed above (e.g., FIGS. 2, 3 and 4) instead represent security protocols executed by the security server 1002 in response to access requests by the client computers 1004.

For example, referring to FIG. 11, an example of a display description or web page 1100 is shown. The security server 1002 may include a web server for creating and providing web pages, such as to the client computer 1004 via the Internet 1008. The web page 1100 is an example of only one of several web pages accessible to and displayable by the client computer 1004 for receiving user input. The web page 1100 of FIG. 11 displays a series of questions for the user interrogation security mode. The web page 1100 receives user responses or input to the questions. The client computer 1004 then submits such responses (e.g., when the user clicks a submit button, not shown), and such responses are then routed back to the security server 1002 for storage in the user security record 500. The user may readily enter answers to such questions using known computer input devices, such as a keyboard or mouse.

Numerous additional or alternative embodiments are possible. For example, under the periodic code generation security mode, the routine 700 may be modified to send a DSC that is appended or prepended to the user's PIN code. The user thus then simply enters his or her PIN code under the routine 300, but the PIN code dynamically and periodically changes as the user receives new DSCs (e.g., via the pager 116). The user knows whether the received code is to be appended or prepended to his or her PIN code. Such a dynamic PIN code may be entered via a telephone or other telecommunications device under the system 100 of FIG. 1 or entered in response to an appropriate web page to access a networked computer resource under the system 1000 of FIG. 10.

Under another alternative embodiment, the time of day security code may be modified to employ the previous days' closing prices for a set of publicly traded stocks. Under this alternative embodiment, the time of day parameter fields 526 through 536 are modified to instead reflect the order in which stock closing prices are to be entered sequentially, where such stocks are selected from a set of six stocks. Alternatively, the user may select stocks from a larger predetermined set of stocks (e.g., having greater than six stocks), or the stocks are selected by the user, such as stocks owned by the user. During each access request performed by the user, the system 102 simply requests the user to enter the previous day closing prices for the selected stocks in a string.

Indeed, the time of day security mode may employ any algorithm, not necessarily one based on the changing time of day, or the previous day closing prices for a set of public-traded stocks. Any algorithm may be employed under this security mode where the algorithm generates a DSC. The algorithm must be relatively simple and understandable by the user, whereby the user and the system may approximately, concurrently generate the same DSC under the algorithm.\

Under another alternative embodiment, security modes may be combined to provide yet further security modes. For example, aspects of the time of day security mode may be modified with the user interrogation mode. For example, the questions that the system 102 poses to the user may relate to the previous day's closing prices for a set of publicly traded stocks owned by the user. The system 102 shuffles the order in which the system asks the user for the previous day's closing price for a stock, where the user may be able to recall such prices after having reviewed them in the morning or at the end of the previous day. Again, the user may apply a weighting to those stocks which he or she wishes to be queried with respect to more frequently. System 102 may readily and automatically obtain information necessary under such algorithm (or other time of day type algorithms) by retrieving information from sources available on the Internet (e.g., financial web sites for stock prices).

Under another alternative embodiment or "matrix mode", the user initially identifies several positions within a matrix of numbers, which is later used effectively as a template to identify appropriate numbers from an N by M matrix of randomly generated numbers. For example, during the setup procedure, the user is presented with a five by five matrix, from which the user selects five positions. An example of such a matrix is shown below as Table 1, which may be transmitted to the user's computer.

TABLE 1

| 1  | 2  | 3  | 4  | 5  |
|----|----|----|----|----|
| 6  | 7  | 8  | 9  | 10 |
| 11 | 12 | 13 | 14 | 15 |
| 16 | 17 | 18 | 19 | 20 |
| 21 | 22 | 23 | 24 | 25 |

In the above example, each of the positions in the matrix of Table 1 are sequentially numbered beginning in the upper left row, and proceeding to the right and down through the matrix. A user may select any series of positions, such as a diagonal identified by the position numbers 5, 9, 13, 17 and 21. This selection of five positions or locations is then stored in the user's record 500.

During implementation, the system provides to the user a similar five by five matrix, but the numbers in each position are scrambled (or each position is filled with a random number selected between one and 25). An example of such a transmitted code matrix is presented below as Table 2:

TABLE 2

| 3  | 11 | 18 | 1  | 7  |
|----|----|----|----|----|
| 6  | 4  | 14 | 10 | 22 |
| 24 | 4  | 8  | 12 | 16 |
| 2  | 9  | 13 | 17 | 21 |
| 15 | 25 | 19 | 23 | 20 |

Continuing with the above example, the user then mentally applies the diagonal series of positions to the new matrix to determine that the current DSC to employ is: 7, 10, 8, 9, and 15 (which correspond to the positions 5, 9, 13, 17 and 21 from the matrix of Table 1). The user then simply transmits the current DSC to the system to be authenticated. The next time the user wished to be authenticated by the system 102, the system sends (at that time, or previously) another code matrix from which the user selects the five diagonal positions to again generate a new DSC. Thus, if a third party intercepted the user's transmission of the DSC at one moment, it would appear unrelated to a second DSC later transited by that same user.

Many alternatives are available under the matrix mode embodiment. For example, a smaller or larger matrix may be employed. To provide a simple interface for the user to employ in a telephonic environment, the matrix may be a three by four matrix as follows:

TABLE 3

| 1 | 2 | 3 |
|---|---|---|
| 4 | 5 | 6 |
| 7 | 8 | 9 |
| * | 0 | # | where the user selects three or more positions within this matrix. The system 102 then transmits to the user the code matrix, from which the user identifies his or her previously selected positions and corresponding digits. For example, the user may select a "Y" pattern corresponding to the positions: 1, 3, 5, 8 and 0. The system 102 then transmits to the user (for display on the user's display associated with the phone, or as a string of random digits replayed to the user as an audio message), from which the user selects the digits in the appropriate locations in the transmitted code matrix to generate the current DSC.

Under another alternative to the matrix mode embodiment, the true DSC corresponds to a transposition of digits. Thus, if the user selected the positions 5, 9, 13, 17 and 21 in the above example, but transposed the first and last digits, (thus corresponding to the positions, in order of 21, 9, 13, 17, and 5), then the true DSC based on the 5 by 5 code matrix above would be 15, 10, 8, 9 and 7. Alternatively, the DSC represents a series of digits transmitted in any order, but this alternative may be less secure. Under another alternative to the matrix mode, the user employs this security mode in a system employing both a computer and a phone, whereby the computer receives from the system 102 the code matrix (e.g., receives Table 2 via a portable computer), while the user transmits the DSC selected from the code matrix over the phone. Thus, a third party must gain access to both the transmitted code matrix over the computer network, and the telephone network to obtain the dialed digits from the telephone to determine the user's series of selected positions within a matrix. Many other alternatives are possible.

In yet another alternative embodiment, the user may select that any of the above security modes be randomly applied or implemented. The system then notifies the user of the current security mode being employed (e.g., by pager or voice mail). Such changing security modes may be changed on any periodic basis, but preferably not too frequently, so as to be disruptive to the user (e.g., hourly being too disruptive, but daily frequency being acceptable to a user). Of course, the user may specify the frequency of security mode change. The system may notify the user with an appropriate prompt associated with and identifying each mode when the user attempts to gain access to the system. Alternatively, the system may simply prompt the user with "please enter your DSC," where the user must then know which algorithm to employ to generate the appropriate DSC. Alternatively, the system may simple notify and prompt the user under a preassigned naming convention, such as "please enter the DSC for security mode number two," where the user knows that security mode two represents the time-of-day security mode.

While the security modes described above are generally used to restrict access to the system overall, such security modes may be selectively applied for given resources or even individual files. For example, the user may wish to apply the time-of-day security mode to restrict access to voice mail messages received by the user from members of the board of directors. The user may further require that such voice mail messages be encrypted using the codes generated under the time-of-day security mode. The system may then store such codes to permit later access and decryption by the user.

The security modes noted herein may be arranged in a hierarchical structure representing increasing levels of security. A basic or default level of security corresponds to use of simply PIN codes, while a highest level of security may employ the voice finger print security mode, possibly in conjunction with additional security modes. Intermediate security modes include the time-of-day and user interrogation security modes. Rather than identifying a particular security mode, the user may simply select a security level associated with each mode in the user's security record 500.

The telecommunication provider or other system provider may derive differing levels of revenue under the security modes described herein. For example, the telecommunication service provider may charge an additional monthly fee to users who wish to have the added functionality to change security modes. Alternatively, or additionally, the telecommunication service provider may charge a different monthly rate to users for use of different security modes. For example, a higher monthly rate will be charged to users who employ the voice finger print security mode, a slightly less rate for users who employ the periodic security code (pager) security mode, and a lesser still amount for users who employ the time-of-day security mode. Furthermore, the telecommunication service provider may charge a per call or per transaction rate for each call or request processed under a heightened security mode (beyond simple PIN codes).

One skilled in the relevant art will appreciate that the concepts of the invention can be used in various environments other than a telecommunications network or the Internet. For example, the concepts can be used in an electronic mail environment in which electronic mail forms and messages are employed by a user to establish and modify the user's security records and access provided via similar messages. In general, the prompts to a user may be of any form, including voice prompts, or display descriptions, such as HTML format, email format or any other format suitable for displaying information (includes character/code-based formats, algorithm-based formats (e.g., vector generated), and bit mapped formats). Also, various communication channels, such as point-to-point dialup connections may be used instead of the Internet, PSTN, WAN or LAN. As noted above, security modes may be connected or performed within a single computer environment, rather than the client/server type environment noted above.

In a broad sense, aspects of the invention represent a method for providing security for a system. The method includes: receiving user input generated by a user of a telecommunications device; retrieving a user profile, wherein the profile indicates at least one security mode; and providing authorization by comparing the received user input to a security code based on the retrieved user profile, wherein the security code is an automatically and dynamically generated user security code.

Aspects of the invention also represent a method of providing security for a system. The method includes: receiving user input selecting one of several security modes, wherein the selected security mode is not a personal identification number (PIN) change; storing a selected security mode in a user profile, wherein the user profile corresponds to the user; and providing authorization by comparing received user input to a security code based on the stored user profile.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other security systems, not necessarily the telecommunications system described in detail above.

The various embodiments described above can be combined to provide further embodiments. These and other changes can be made to the invention in light of the above detailed description. In general, in the following claims, the terms used should not be construed to limit the invention to the specific embodiments disclosed in this specification and the claims, but should be construed to include all security systems that operate under the claims to provide a method for limiting access to facilities or resources. Accordingly, the invention is not limited by the disclosure, but instead the scope of the invention is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number, respectively. Additionally, the words "herein" and words of similar import, when used in this application, shall refer to this application as a whole, and not to any particular portions of this application.

While certain aspects of the invention are presented below in certain claim forms, the inventors contemplate the various aspects of the invention in any number of claim forms (e.g., while only one aspect may be recited as embodied in a computer-readable medium, other aspects may likewise be embodied in a computer-readable medium). Further, while some aspects are embodied as a method, other aspects are embodied within broad hardware categories, such as a computer or data processor, or subcategories, such as a mobile or cellular telephone.

What is claimed is:

1. In a telecommunications system coupled to a user's telecommunications device, a security apparatus comprising:

a database storing at least one user profile, wherein the profile indicates one of a plurality of security modes selectable by the user; and a computer coupled to communicate with the database, and coupled to the telecommunications system to receive telecommunications data transmissions, wherein the computer is configured to:

receive mode selection user input, wherein the mode selection user input includes selecting one of the plurality of security modes, wherein the selected security mode is not a personal identification number (PIN) change,
store the selected security mode in the at least one user profile, wherein the user profile corresponds to the user,
in response to a telecommunications call from the user, retrieve the at least one user profile,
receive authorization user input, and
provide user authorization by comparing the received authorization user input to a security code based on the retrieved user profile, wherein the security code is an automatically and dynamically generated user security code based on the selected security mode,
wherein the plurality of security modes includes a current time sequence recognition mode wherein the user security code is based on predetermined numerical sequence based on an hour of day, day of week, day of month and month of year, and wherein the mode selection user input includes a user selected arrangement of the hour of day, day of week, day of month and month of year.

2. A method of providing security for a system, comprising:
receiving user input;
retrieving a user profile, wherein the profile indicates one security mode; and
providing authorization by comparing the received user input to a security code based on the retrieved user profile, wherein the security code is an automatically and dynamically generated user security code,
wherein the system is a telecommunications system, and wherein the method includes:
receiving input from the user for assigning a selected security mode selected from a plurality of security modes to at least one event, wherein the event is a predetermined time, a data type received by the telecommunications system or a source of an incoming data signal to the telecommunications system; and wherein the predetermined time is a time of day or day of week, wherein the data type is a voice telephone call, videophone call, electronic mail transmission or a facsimile transmission, and wherein the source is an internal/external transmission or a transmission from a predetermined source.

3. A method of providing security for a system, comprising:
receiving user input;
retrieving a user profile, wherein the profile indicates one security mode; and
providing authorization by comparing the received user input to a security code based on the retrieved user profile, wherein the security code is an automatically and dynamically generated user security code,
wherein the security mode includes a current time sequence recognition mode wherein the user security code is based on predetermined numerical sequence based on a hour of day, day of week, day of month and month of year, and wherein the hour of day, day of week, day of month and month of year are arranged in a predetermined fashion known by the system and the user.

4. A method of providing security for a system, comprising:
receiving user input selecting one of a plurality of security modes, wherein the selected security mode is not a personal identification number (PIN) change;
storing the selected security mode in a user profile, wherein the user profile corresponds to the user; and
providing authorization by comparing a received user input to a dynamic security code based on the stored user profile and the user selected security mode
wherein the system is a telecommunications system, and wherein the method includes:
receiving input from the user for assigning a selected security mode selected from the plurality of security modes to at least one event, wherein the event is a predetermined time, a data type received by the telecommunications system or a source of an incoming data signal to the telecommunications system; and wherein the predetermined time is a time of day or day of week, wherein the data type is a voice telephone call, videophone call, electronic mail transmission or a facsimile transmission, and wherein the source is an internal/external transmission or a transmission from a predetermined source.

5. A method of providing security for a system, comprising:
receiving user input selecting one of a plurality of security modes, wherein the selected security mode is not a personal identification number (PIN) change;
storing the selected security mode in a user profile, wherein the user profile corresponds to the user; and
providing authorization by comparing a received user input to a dynamic security code based on the stored user profile and the user selected security mode,
wherein the plurality of security modes includes a current time sequence recognition mode wherein the dynamic security code is based on predetermined sequence based on a hour of day, day of week, day of month and month of year, and wherein the hour of day, day of week, day of month and month of year are arranged in a predetermined fashion by the method and known by the user.

6. An apparatus for restricting access to one or more resources, the apparatus comprising:
a computer logically coupled to the one or more resources, wherein the computer is configured to receive user input; retrieve a user profile, wherein the profile indicates at least one security mode; automatically and dynamically generate a user security code based on the indicated security mode and the retrieved user profile; and
provide authorization by comparing the received user input to the dynamically generated user security code,
wherein the security mode includes a current time sequence recognition mode wherein the user security code is based on predetermined numerical sequence based on a hour of day, day of week, day of month and month of year, and wherein the hour of day, day of week, day of month and month of year are arranged in a predetermined fashion known by the computer and the user.

7. A computer-readable, signal bearing medium storing instructions for a computer for providing security for a system, the instructions comprising:
receiving user input;
retrieving a user profile, wherein the profile indicates at least one security mode; and
providing authorization by comparing the received user input to a security code based on the retrieved user profile, wherein the security code is an automatically and dynamically generated user security code,
wherein the security mode includes a current time sequence recognition mode wherein the user security code is based on predetermined numerical sequence based on a hour of day, day of week, day of month and month of year, and wherein the hour of day, day of week, day of month and month of year are arranged in a predetermined fashion known by the system and the user.

8. A computer-readable, signal bearing medium storing instructions for a computer for providing security for a system, the instructions comprising:

receiving user input;

retrieving a user profile, wherein the profile indicates at least one security mode; and providing authorization by comparing the received user input to a security code based on the retrieved user profile, wherein the security code is an automatically and dynamically generated user security code, wherein the instructions include:

receiving user input selecting one of a plurality of scrambling modes; and providing an indication to the user of an initial code, where the indication is provided to the user over another system that differs from the system; and wherein receiving user input includes receiving a true security code corresponding to the indicated initial code modified by the user based on the selected mode.

9. A computer-readable and computer-generated data signal transmitted via a transmission medium, the generated data signal permitting a computer system to perform a method of providing security for a system, comprising:

receiving user input selecting one of a plurality of security modes, wherein the selected security mode is not a personal identification number (PIN) change;

storing the selected security mode in a user profile, wherein the user profile corresponds to the user; and providing authorization by comparing a received user input to a dynamic security code based on the stored user profile and the user selected security mode, wherein the plurality of security modes includes a current time sequence recognition mode wherein the dynamic security code is based on predetermined sequence based on a hour of day, day of week, day of month and month of year, and wherein the hour of day, day of week, day of month and month of year are arranged in a predetermined fashion by the method and known by the user.

10. In a system, a user prompt signal for use in providing security for the system, comprising:

a first user prompt portion for instructing a user to select one of a plurality of security modes;

a second user prompt portion for instructing a user to input a modification to a user profile, wherein the user profile corresponds to the user, wherein the modification applies to a user selected security mode, and wherein the selected security mode and modification are not a personal identification number (PIN) change; and a third user prompt portion for instructing a user to input a dynamic security code based on the modified user profile and the user selected security mode, wherein the first user prompt portion includes selecting one of a plurality of transmitted code scrambling modes corresponding to methods of generating a dynamic security code based on an initial code transmitted to the user.

11. A computer-readable medium containing a data structure for use in restricting access to resources, the data structure comprising:

at least first and second fields identifying respective first and second user-selectable security modes, wherein the first and second security modes do not both represent a personal identification number (PIN) change, and wherein the first and second security modes each restrict access to the resources; and at least a third field comprising parameters associated with a user-selected one of the first and second security modes, wherein the first security modes includes a current time sequence recognition mode wherein the dynamic security code is based on predetermined sequence based on a hour of day, day of week, day of month and month of year, and wherein the data structure includes fields indicating an order of hour of day, day of week, day of month and month of year variables.

* * * * *